United States Patent
Sadanaga

[11] 3,875,934
[45] Apr. 8, 1975

[54] DEVICE FOR TRAINING OCULAR MUSCLES

[76] Inventor: Kazukiyo Sadanaga, 78 Hasunuma-cho, Itabashi-ku, Tokyo, Japan

[22] Filed: Mar. 20, 1974

[21] Appl. No.: 452,974

[30] Foreign Application Priority Data
Mar. 20, 1973 Japan.............................. 48-32480

[52] U.S. Cl. .............................................. 128/76.5
[51] Int. Cl............................................... A61h 5/00
[58] Field of Search ............ 128/76.5; 351/29, 39, 2

[56] References Cited
UNITED STATES PATENTS

| | | | |
|---|---|---|---|
| 1,949,022 | 2/1934 | Mandaville | 128/76.5 |
| 2,664,885 | 1/1954 | Mandaville | 128/76.5 |
| 2,676,588 | 4/1954 | Shamsky | 128/76.5 |
| 3,419,323 | 12/1968 | Lookabaugh | 128/76.5 X |
| 3,433,219 | 3/1969 | Genevay | 128/76.5 |

*Primary Examiner*—Richard A. Gaudet
*Assistant Examiner*—J. Yasko
*Attorney, Agent, or Firm*—Carothers and Carothers

[57] ABSTRACT

A device for training ocular muscles which comprises eye and object means so mounted that they may be moved between the nearest and the farthest positions by a driving means to reciprocally change the distance between them, and prism means mounted in front of said object lens means in such fashion that the prism means may cross the optical axis of the object lens means and that it may be rotated by said driving means accompanied with the change of the distance between the lens means. The image of an object viewed through the eye lens means continuously move along the optical axis and in the traverse, so that ocular muscles may be trained by viewing the moving image.

5 Claims, 6 Drawing Figures

PATENTED APR 8 1975

DEVICE FOR TRAINING OCULAR MUSCLES

BACKGROUND OF THE INVENTION

This invention relates to devices used for treatment of pseudo-myopia and eyestrain and, in particular, to devices for training ocular muscles.

In the medical view point, pseudo-myopia and acquired myopia are caused and developed by viewing objects up close for lengths of time, such as reading books. In close work, or when viewing objects up close, two actions are performed at one time, one of them being a control action to enable the eye to visually accommodate to near objects, wherein the ciliary muscles contract to cause the Zinn's zonule which permits the crystalline lens to deform to increase its refractive power, and the other being a converging action to enable both eyes to direct to near objects, wherein the medical recti muscles, which are a kind of external ocular muscle, contract to pull the eye inward. It is noted lengthy close work causes the extended contraction time and tension of the ciliary muscles and medical recti muscles. The physiological variations of the eyes developed during such long periods of time are causes of pseudo-myopia and eyestrain.

As treatments of pseudo-myopia and eyestrain, medicinal therapy, ultrasonic wave treatment, low frequency treatment, crystalline lens training treatment, and convex lens wearing treatment have been known in the prior art. The haploscope and a pseudo-myopia treating device of an improved Synoptophore type as proposed by Ohtsuka have also been used in the prior art. But these treatments have faults in that the effect of treatment is insufficient and/or that it is necessary to go to a doctor every day for the treatment, so that sufficient cure may not be expected.

OBJECTS OF THE INVENTION

The purpose of this invention is to overcome the above mentioned faults and to provide a device by which the treatment may be readily performed in private, without secondary effects of medicines and harmful effects on the eyes.

A primary object of this invention is to provide a device for training ocular muscles.

Another object of this invention is to provide an optical device in which images of objects may be continuously moved in various directions, in order to attain the above objects.

Still another object of this invention is to provide an optical device for training ocular muscles with simple construction, simple operation and economy.

SUMMARY OF THE INVENTION

A device for training ocular muscles of this invention comprises a housing, two eye lens means mounted in a wall of the housing, two windows formed in another wall of the housing with each window facing each eye lens means, two prism means disposed in the housing with each prism means being between each eye lens means and each window respectively in the vicinity of each window, and two object lens means disposed in the housing between each prism means and each eye lens means respectively. Each prism means is continuously movable so that the light transmission direction through the prism means may be varied, and each object lens means is also continuously movable on the optical axis. The device furthermore comprises driving means for continuously move each prism means and each object lens means, so that the image viewed through each eye lens means may continuously move toward and away from the viewer (or the image may be multiplied and reduced) and simultaneously in the traverse direction in relation to the optical axis.

Accordingly, muscles of both eyes viewing the moving image through the two eye lens means may be trained and, therefor, may be released from contraction and tension.

Further objects and features of this invention will be clearly understood from the following descriptions relating to embodiments of the invention in conjunction with the annexed drawings.

DETAILED DESCRIPTION OF PREFERRED EMBODIMENTS

Figure 1:
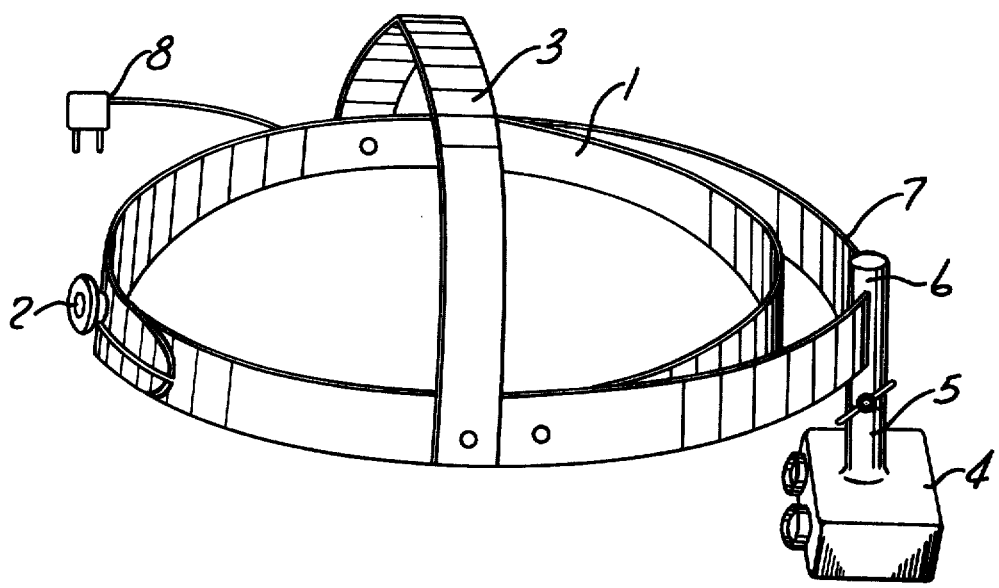
FIG. 1 is a perspective view of an embodiment of this invention.

Referring to FIG. 1, the embodiment illustrated comprises a supporting band 1 to be worn on a human head. As its rear portion, a screw device 2 is provided for adjusting the peripheral length of the supporting band 1 to increase or decrease the same. An upper band 3 connects between both side portions of the supporting band 1 in bridge fashion.

A training device 4 is provided with an arm 5 at the top of the housing of device 4, which arm is pivoted at its top portion to a securing rod 6 so that the arm may be rotatable. The securing rod 6 is secured to the supporting band 1 through a securing band 7. An electric cord 8 is provided for feeding electric energy to a motor in the device 4.

Figure 2:
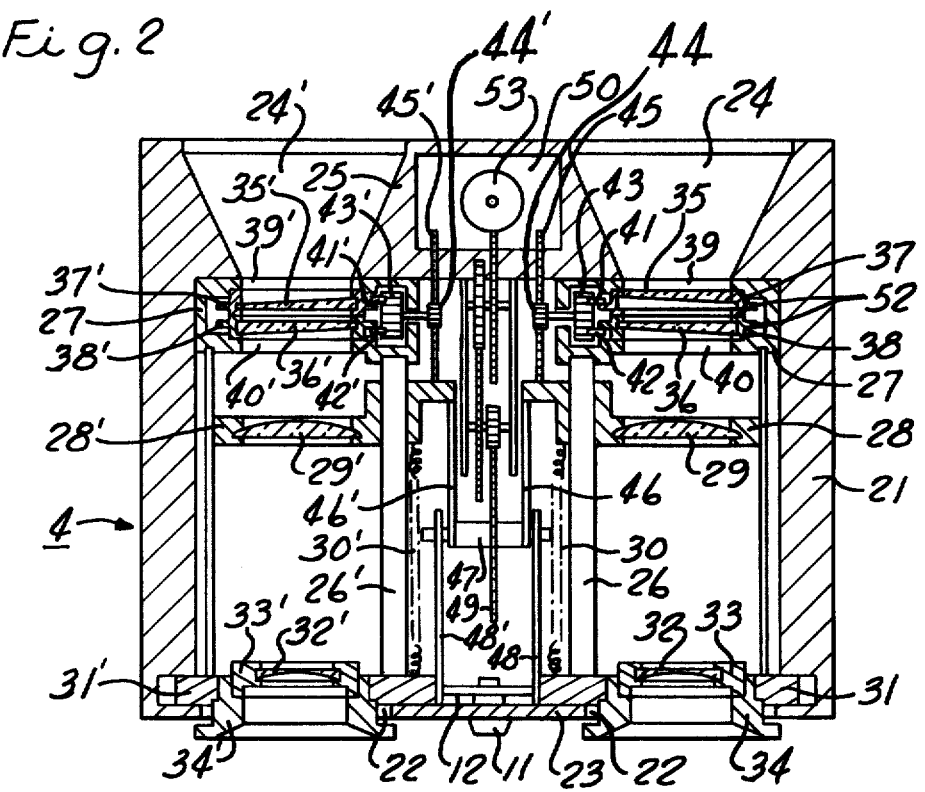
FIG. 2 is a sectional view of a training device shown in FIG. 1.

Referring to FIG. 2, a housing 21, which is formed of metal, plastic resin, wood or other non-transparent material, preferably plastic resin, has two openings 22 and 22' in wall 23 and two windows 24 and 24' in another wall 25 opposite to wall 23 having the two openings 22 and 22'.

Openings 22 and 22' face windows 24 and 24' respectively.

Two spaced pillers 26 and 26' are fixed on the wall 23 with and extend from the wall 23 towards the opposite wall 25. Boxes 27 and 27' for containing prism pieces are secured to the end portions of pillers 26 and 26'.

Lens frames 28 and 28' support convex object lenses 29 and 29' and are slidably mounted on pillers 26 and 26'. It will be noted that object lenses 29 and 29' are movable along pillers 26 and 26' in the direction of their optical axes.

Between each lens frame 28 and 28' and the wall 23 a coil spring 30 and 30' is placed under strain and so that each frame 28 and 28' may be continuously forced towards the wall 23.

On the inside surface of the wall 23 two slider plates 31 and 31' are slidably mounted which have holes for retaining concave eye lenses 32 and 32'. Both of these sliders 31 and 31' are biased towards each other by spring means (not shown).

Two lens frames 33 and 33' supporting eye lenses 32 and 32' respectively, are connected to respective ring bodies 34 and 34' which are rotatably mounted in holes in sliders 31 and 31'.

An end portion of each ring body 34 and 34' extends through each opening 22 and 22' outside the housing and flares.

Lens frames 33 and 33' may be moved along their optical axes forward and backward by rotating ring bodies 34 and 34' in order to finely adjust the positions of the eye lenses. Such fine adjustment constructions have been known in the prior art of optical devices such as binoculars.

In each box 27 and 27' two prism pieces 36, 35' and 36' are rotatably disposed, which are secured in ring frames 38, 37' and 38', respectively.

Boxes 27 and 27' have apertures 39, 40, 39' and 40' in opposite walls facing windows 24 and 24' and object lenses 29 and 29'.

Figure 4:
FIG. 4 is a perspective view of a prism piece shown in FIG. 2.

Each prism piece is a transparent circular plate, preferably a glass plate, having the shape of a cylindrical-trapezoid or a shape obtained by cutting a cylinder diagonally, as shown in FIG. 4.

Figure 5:
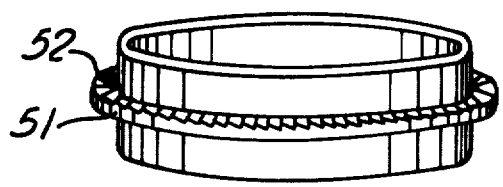
FIG. 5 is a perspective view of a prism supporting ring shown in FIG. 2.

Each ring frame, as shown in FIG. 5, has a collar 51 around the peripheral surface. One side surface of the collar is provided with teeth 52 for engaging with a gear.

Referring again to FIG. 2, two prism pieces 35, 36, 35' and 36' are disposed with facing similar surfaces facing each other, while ring frames 37, 38, 37 and 38 are superimposed with similar side surfaces of the respective collars facing each other. In the drawing, the side surfaces provided with no teeth 52 (FIG. 5) face each other.

In the boxes 27 and 27', small gears 41, 42, 41' and 42' are disposed to engage with teeth 52 of ring frames 37, 38, 37' and 38', respectively. Two pairs of small gears 41, 42, 41' and 42' engage with gear wheels 43 and 43', respectively, and their shafts extend outside the respective boxes to respective pinions 44 and 44' secured to end portions thereof.

Pinions 44 and 44' engage with racks 45 and 45' which are secured to lens frames 28 and 28', respectively.

Figure 3:
FIG. 3 is a plan view of a cam shown in FIG. 2.

Lens frames 28 and 28' engage with cams 46 and 46' respectively, each cam having, for example, a shape as shown in FIG. 3. Cams 46 and 46' are fixed on a rotating shaft 47 which is borne at opposite end portions thereof by supporting plates 48 and 48' which are fixed to sliders 31 and 31' respectively. On the shaft 46 a gear wheel 49 is secured which is rotated by an electric motor 50 through a worm 53 and a plurality of gear wheels (four gears are shown in the drawing).

A button 11 and a cam 12 are provided for finely adjusting the distance the between two eye lenses. The cam surface of the cam 12 engages with supporting plates 47 and 47' so that sliders 31 and 31' carrying eye lenses 32 and 32' may be moved on the internal surface of the wall 23 closer to and farther from each other in cooperation with a prescribed biasing spring means (not shown).

In operation, a patient wears the supporting band 1 on his head, rotates the arm 5 to fit the device 4 to his eyes and, thereafter, keeps it stationary.

Then, when the electric cord 8 is connected to an electric source, the driving motor 50 is rotated.

The cam shaft 47 and cams and 46' are rotated by the motor, so that lens frames 28 and 28' are moved backward and forward under the tension of each spring 30 and 30'.

As a result, object lenses 29 and 29' are moved toward and away from respective eye lenses 32 and 32' in the direction of the respective optical axis. Accompanying the reciprocal of object lenses 28 and 28' pinions 44 and 44' engaged with their respective racks, rotate in clockwise and counter-clockwise directions. Thus small gears 41, 42, 41' and 42' rotate through gears 43 and 43' on shafts common with respective pinions 44 and 44' to permit prism pieces 35, 36, 35' and 36' to reciprocally rotate in clockwise and counter-clockwise directions. It will be noted that adjacent prism pieces 35 and 36, as well as 35' and 36' rotate in opposite directions to one another.

Since light incident through windows 24 and 24' is varied in its direction due to the rotation of the prism pieces, and since the magnifying power of the lens system is varied due to the backward and forward movement of the object lenses, an image of an object outside the windows 24 and 24', which is viewed through the optical system consisting of the prism pieces, convex lens and concave lens, continuously moves and simultaneously changes its size. Thus the convergence action (the action to direct both eyes inward when seeing near objects) and the divergence action (the action to direct both eyes outward) of the may be repeated, while the control action (the action to increase the refractive index of the crystalline lens to enable the eye to visually accommodate to near objects) and non-control action (relaxation of the control) of each eyeball are repeated. As a result, internal and external muscles of both eyes may be forced to exercise repeatedly, so that they may be forced from contraction and tension. As there is a tendency in human eyes to become accommodative in the event of convergence, this method utilizes the principle that a relaxation in this accommodation should be facilitated conversely and quite easily in the state of divergence. Thus, the device has a remarkable effect for the treatment of pseudo-myopia and eyestrain, and furthermore has various advantages such as in that the treatment may be effected without harmful effects of medicines and readily effected in private so that time required to visit a doctor may be saved.

Figure 6:
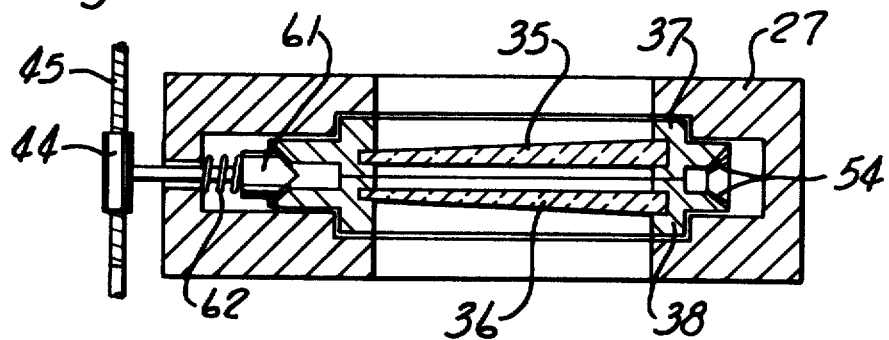
FIG. 6 is a sectional view of a main part of a modification of the structure illustrated in FIG. 2.

FIG. 6 shows a modification in which instead of using one gear 43 and 43' and two small gears 41, 42, 41' and 42' in FIG. 2, a bevel gear 61 is used. The bevel gear 61 is connected with the pinion 44 and 44' which engages with the rack 45 and 45', and engages with teeth 54 on collars of both ring bodies 37, 38, 37' and 38'. 62 is a spring which forces the bevel gear 61 against both ring bodies to assure a reliable engagement with teeth 54.

Table 1 demonstrates the effect caused by the treatment using the device of this invention wherein patients looked at television through the device of this invention twenty minutes every day.

| Patient | | Diopter before treatment | Diopter after treatment | treatment period |
|---|---|---|---|---|
| A | Right | −1.5 | −0.5 | 2 months |
|   | Left  | −1.0 | 0 | |
| B | Right | −4.0 | −2.0 | 3 months |
|   | Left  | −4.0 | −2.0 | |
| C | Right | −1.5 | 0 | 2 months |
|   | Left  | −1.5 | 0 | |
| D | Right | −3.0 | −2.0 | 2 months |
|   | Left  | −1.5 | −1.0 | |
| E | Right | −1.5(astigmatism −0.5) | −0.5 | 2 months |
|   | Left  | −1.5(astigmatism −0.5) | −0.5 | |

It should be noted that astigmatism was treated by the use of the device of this invention, as noted from the data of patient E in Table 1.

A person who is in an advanced stage of myopia used this device. Both of his eyes were −1.5 diopter at the beginning of the use of this device and were −2.5 diopter after use for six months. But after further use of three months both eyes were −2.0 diopter, which was maintained by further continuous use. Thus the advance of myopia was arrested.

A concave lens and a convex lens have been used for the eye lens means and object lens means, respectively, but different combinations of various lenses may be used for those lens means.

This invention has been described relating to particular embodiments, but these embodiments do not restrict this invention. Other designations and modifications may be easily made by those skilled in the art within the scope of this invention.

I claim:

1. A device for training ocular muscles comprising a housing having a pair of windows in a first wall thereof, a pair of eye lens means mounted in a secured wall of said housing opposite to said first wall, each eye lens means facing one of said windows respectively, a pair of prism means each of which is respectively disposed in said housing between each opposed set of window and lens means in the vicinity of each window, first driving means in said housing for continuously moving said pair of prism devices in such manner that the light transmission direction through each of said prism means is varied, a pair of object lens means, each of which is disposed respectively between each opposed set of prism means and eye lens means, second driving means in said housing for continuously and reciprocally moving said pair of object lens means, and a driving power source for actuating said first and second driving means.

2. A device for training ocular muscles comprising a housing having a pair of windows in a first wall thereof, a pair of eye lens means mounted in a second wall of said housing opposite to said first wall such that each eye lens means respectively faces one window, a pair of prism means each of which is rotatably disposed in said housing between each opposed set of window and eye lens means in the vicinity of each window, a pair of object lens means each of which is disposed for sliding on its optical axis between each opposed set of prism means and eye lens means respectively, biasing means for forcing each object lens means towards each eye lens means, cam means engaging with each object lens means for continuously moving said object lens means by rotation thereof in cooperation with said biasing means, rack means disposed to move with the movement of said respective object lens means, pinion means disposed to engage with said rack means, gear means connected with said pinion means and engaged with teeth provided to peripheries of said prism means to rotate said prism means, an electric motor, and rotation transporting means to transfer the rotation of said electric motor to said cam.

3. The device for training ocular muscles claimed in claim 2, in which each of said prism means has two superimposed prism pieces, each prism piece being a transparent circular plate having the shape of a cylindrical trapezoid.

4. The device for training ocular muscles claimed in claim 3, in which each prism piece is supported in a ring body, said ring body having teeth on its periphery engaging with said gear means connected to said pinion means.

5. The device for training ocular muscles claimed in claim 4, in which each of said pair of eye lens means consists of a concave lens, each of said pair of object lens means consisting of a convex lens.

* * * * *